Jan. 23, 1945. H. FROMM 2,367,859
FRUIT JUICE EXTRACTOR
Filed March 1, 1943 5 Sheets-Sheet 3
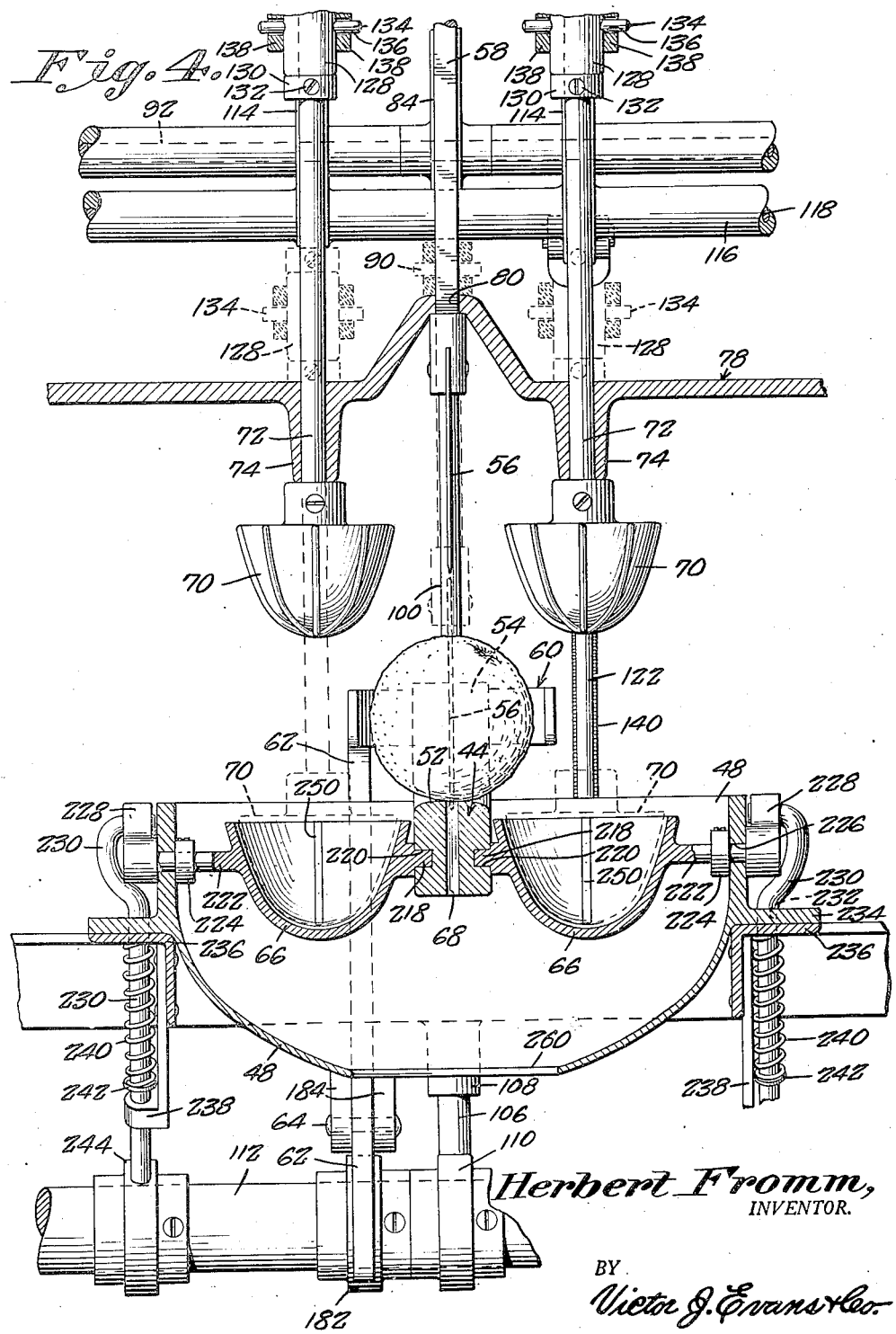
Herbert Fromm,
INVENTOR.
BY
Victor J. Evans & Co.
ATTORNEYS

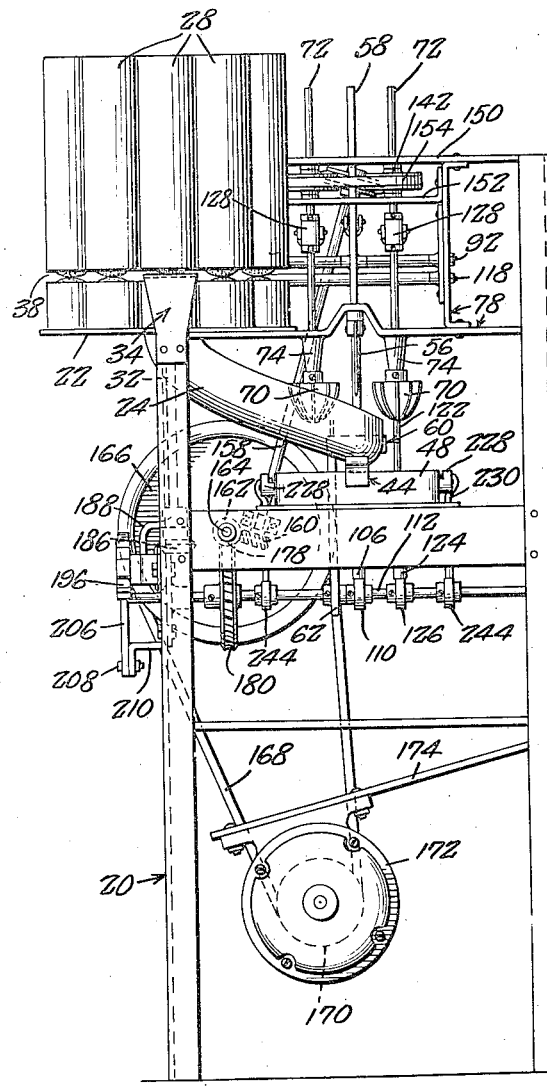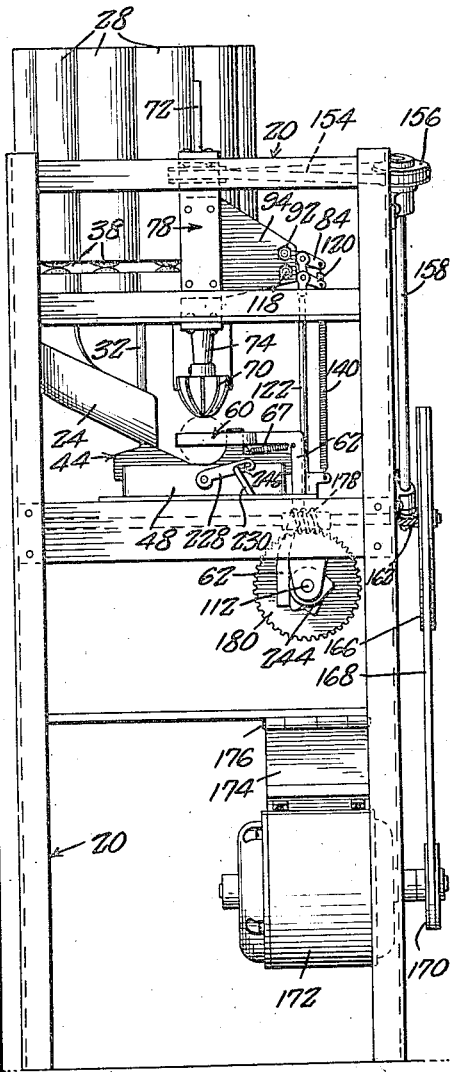

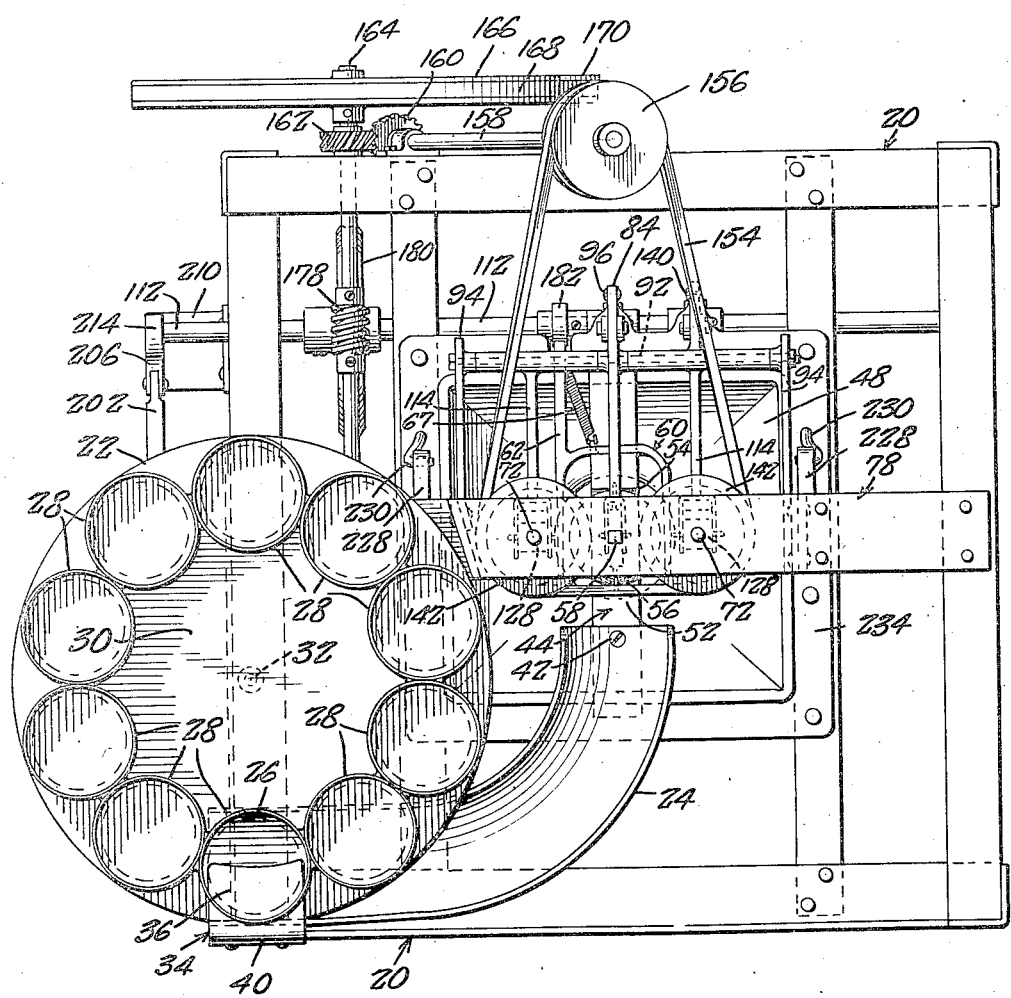

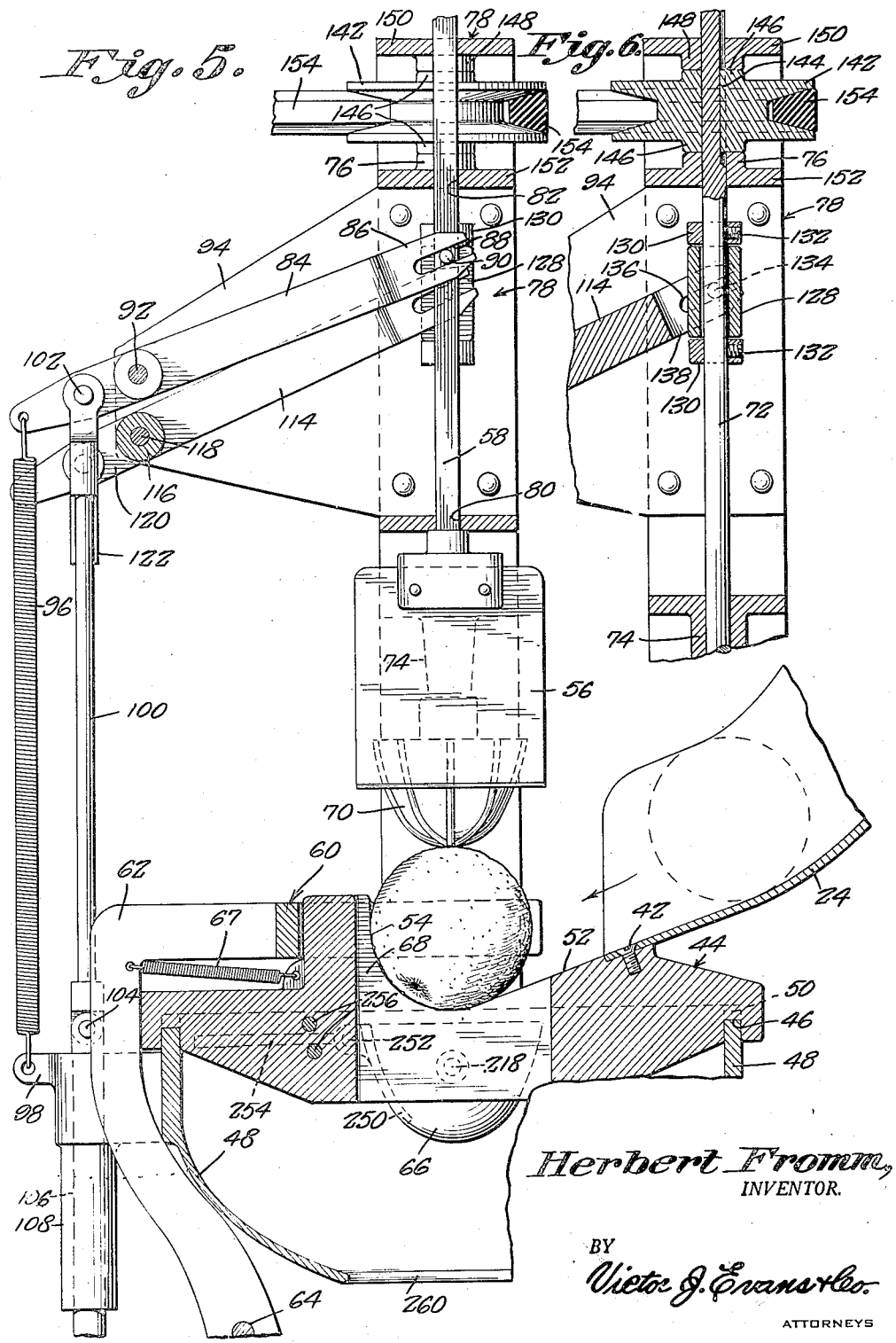

Jan. 23, 1945. H. FROMM 2,367,859
FRUIT JUICE EXTRACTOR
Filed March 1, 1943 5 Sheets-Sheet 5
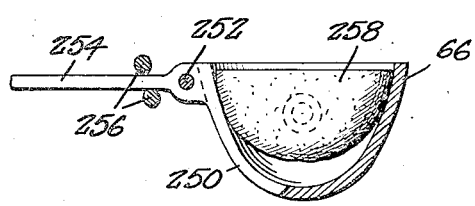
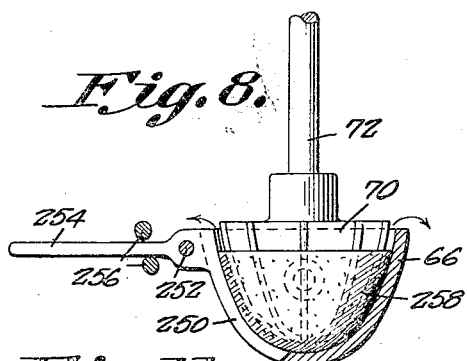
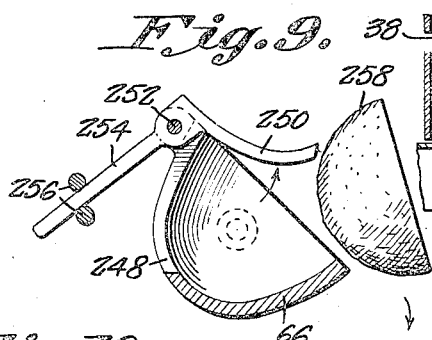
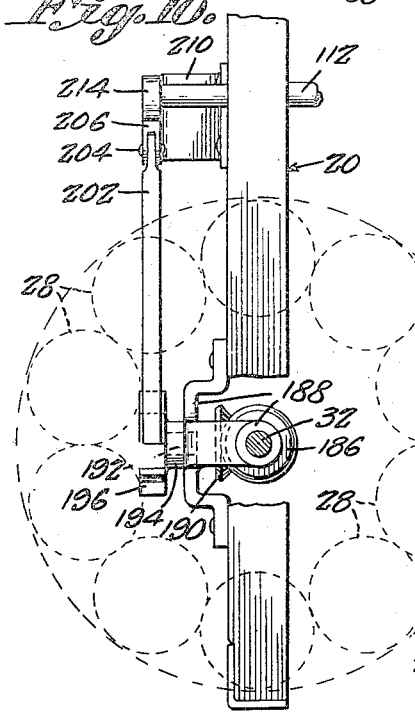
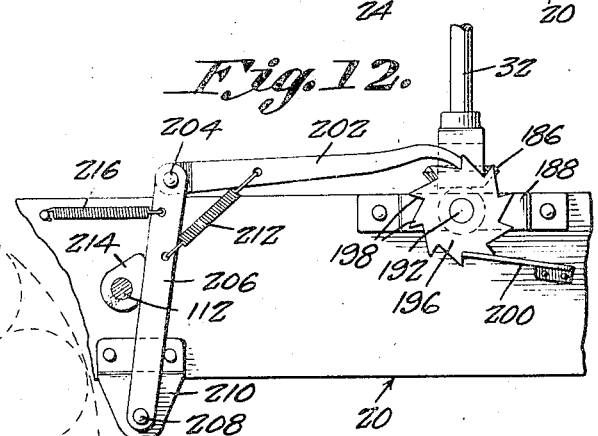
Herbert Fromm,
INVENTOR.

Patented Jan. 23, 1945

2,367,859

UNITED STATES PATENT OFFICE 2,367,859

FRUIT JUICE EXTRACTOR

Herbert Fromm, Hamburg, Wis.

Application March 1, 1943, Serial No. 477,595

13 Claims. (Cl. 146—3)

My invention relates to the extraction of fruit juices, and has among its objects and advantages the provision of an improved fruit juice extractor embodying novel means whereby the fruit, such as oranges is fed one at a time to a dividing knife, in which a novel arrangement of hands or cups are provided for receiving the halves from the knife, together with a novel reamer means are provided for coaction with the cups for extracting the fruit juices and subsequently discharging the skins from the cups.

In the accompanying drawings:

Figure 1 is a side view of a fruit juice extractor in accordance with my invention.

Figure 2 is a similar view but with the machine turned 90 degrees about its vertical axis.

Figure 3 is a top view.

Figure 4 is an enlarged sectional view of a portion of the machine in the plane of the reamers and their respective fruit supporting cups.

Figure 5 is a side view of the structure of Figure 4.

Figure 6 is a sectional detail view of one of the reamer advancing means.

Figure 7 is a sectional view of one of the cups with a fruit half dropped therein.

Figure 8 is a similar view illustrating the reamer advanced into the fruit half.

Figure 9 is a view illustrating the cup tipped for discharging the fruit skin therefrom.

Figure 10 is a top view of a portion of the fruit feeding means.

Figure 11 is a fragmentary view of two of the fruit containing tubes.

Figure 12 is a side view of the structure of Figure 10, and

Figure 13 is a fragmentary detail view of an adjustable fruit dam.

In the embodiment of the invention selected for illustration, I make use of a frame structure 20 upon which is mounted a horizontal floor or plate 22 provided with a downwardly inclined chute 24 having its receiving end arranged in alignment with an opening 26 in the floor 22. Upon the floor 22 are mounted a plurality of upright fruit tubes 28, the lower ends of the tubes being fixedly attached to a rotative plate 30 fixed to a shaft 32 rotatably supported in a bearing 33 attached to the floor 22. All the tubes 28 are arranged concentrically of the axis of the shaft 32 so that the tubes are successively brought into alignment with the opening 26 through rotation of the shaft and the plate 30. The tubes may be welded one to the other and to the plate 30.

The fruit is stacked in vertical columns in all the tubes 28. Means for restraining all the fruit in each successive tube from falling at one time through the opening 26 comprises a dam 34 having a blade like element 36 paralleling the floor 22 and arranged in the plane of slots 38 in the tubes 28. The dam 34 includes a shank 40 which is mounted on the frame 20. The blade 36 is so positioned as to pass between the two lowermost fruit in the successive tubes as they are brought into alignment with the opening 26. The blade extends sufficiently far inside the tube in its feeding position to effectively hold the fruit thereabove from dropping through the opening 26, with the blade having a width such as to perform a damming function until such time as the tube is rotated sufficiently far to one side of the opening 26 to drop the fruit onto the floor 22.

The lower end of the chute 24 is attached at 42 to a cutting block 44 recessed at 46 for the reception of the upper edge margin of a bowl 48. This bowl is also recessed at 50 to receive the end margins of the cutting block to restrain the block from relative lateral movement on the bowl. The block 44 has a declining floor 52 upon which the fruit rolls from the chute 24, with the floor 52 curving upwardly to provide a rear wall or stop 54 against which the fruit lodges to be cut in halves through the medium of a blade 56 attached to a reciprocating shaft 58.

While the block 52 is relatively narrow, the fruit is effectively supported thereon through the medium of a holder 60 carried at the upper end of a bar 62. This bar is mounted for pivotal movement about a supporting shaft 64 so that the holder may be pivoted clear of the fruit after it is cut into halves to permit the latter to fall or pivot outwardly from the blade 56 into hands or cups 66. A return spring 67 yieldingly supports the holder 60 in the position of Figure 2. The blade 56 moves freely in a slot 68 in the block 52, with the blade cutting entirely through the fruit so that the halves are completely severed one from the other to fall in opposite directions into their respective cups 66.

The cups 66 are respectively vertically aligned with rotary reamers 70. Each reamer is fixed to a shaft 72 mounted for axial and rotary movement in bearings 74 and 76 carried by a frame 78 fixedly related to the frame 20. The shaft 58 is guided in openings 80 and 82 in the frame 78. This shaft is mounted for longitudinal movement in the openings 80 and 82 and is actuated by a lever 84 having two fingers 86 straddling the shaft 58 and slotted at 88 to receive a pin 90 extending transversely through the shaft 58.

The lever 84 is pivotally mounted on a shaft 92 carried by brackets 94 fixed to the frame 78. The shaft 92 is located intermediate the ends of the lever 84, and the lever is yieldingly held in its normal position of Figure 5 by reason of a tension spring 96 having one end attached to the outer end of the lever and its other end connected with a lug 98, attached to the bowl 48. A link 100 is pivotally connected at 102 with the lever 84 and at 104 with a push rod 106 slidably mounted in a bearing 108. This rod is actuated by a cam 110 attached to a shaft 112.

Two levers 114 are provided for the two shafts 72. These levers are fixed to a sleeve 116 rotatably mounted on a shaft 118 carried by the brackets 94. An arm 120 is fixed to the sleeve 116 and is actuated by a link 122 identical with the link 100 and pivotally connected with a push rod 124 corresponding to the push rod 106. The push rod 124 is actuated by a cam 126 attached to the shaft 112.

Each shaft 72 is provided with a sleeve 128 fitting loosely thereon and restrained from relative axial movement by collars 130 made secure by set screws 132. Each sleeve is connected with one lever 114, by pins 134 attached to the sleeve 128 and slidably guided in slots 136 in the fingers 138 straddling the shaft. A tension spring 140 corresponding to the spring 96 is attached to the arm 120 for yieldingly holding the two levers 114 in the normal position of Figure 5. Thus the shaft 72 may be moved upwardly and downwardly through pivotal movement of the levers 114, these levers being connected as a unit.

Means for turning the shafts 72 comprise grooved wheels 142 keyed at 144 to their respective shafts, but with the keys permitting relative longitudinal movement of the shafts. The wheels 142 are restrained from relative axial movement on the shafts by reason of engagement between the wheel hubs 146 and bosses 148 on the members 150 and 152 of the frame 78.

A belt 154 passes around the wheels 142 and around a drive wheel 156 attached to a shaft 158 provided with a worm wheel 160 meshing with a worm 162 fixed to a shaft 164 having a large grooved wheel 166 fixed thereto and driven by a belt 168 passing around a grooved wheel 170 driven by an electric motor 172. This motor is mounted on a board 174 hinged at 176 to the frame 20 so that the weight of the motor may be utilized as a belt tightener.

A second worm 178 is fixed to the shaft 164 and meshes with a worm gear 180 keyed to the shaft 112 to supply power for actuating the rod 58 and the two rods 72 for reciprocatory action in a predetermined order to first bring the blade 56 downwardly for cutting the fruit and then bringing the reamers 70 into reaming relationship with the cups 66. The holder 60 moves to its retracted position immediately upon severance of the fruit, which motion is imparted to the holder against the tension of the spring 67 by a cam 182 fixed to the shaft 112 for engagement with the lower end of the bar 62. This bar is mounted between lugs 184 depending from the bowl 48 and supporting the shaft 64.

Means for rotating the shaft 32 comprises a bevel gear 186 attached to the shaft underneath a bracket 188 attached to the frame 20 for rotatably supporting the shaft. A bevel gear 190 meshes with the gear 186 and is fixed to a shaft 192 supported in a bearing 194 fixed to the bracket 188. To the shaft 192 is fixedly connected a ratchet wheel 196 having teeth 198 equal in number to the tubes 28. The wheel 196 may be rotated in a clockwise direction when viewing Figure 12, but is restrained from counterclockwise rotation by means of a resilient latch 200 attached to the frame 20. An arm 202 is pivotally connected at 204 with a link 206 pivotally connected at 208 with a bracket 210 attached to the frame 20. The arm 202 is yieldingly held in engagement with the wheel 196 by a tension spring 212 interconnecting the arm with the link 206. A cam 214 is fixed to the shaft 112 for imparting oscillatory motion to the link 206 and rotary motion to the wheel 196 one tube at a time. Such rotation of the wheel 196 rotates the tubes 28 a distance amounting to one tube at a time for bringing the successive tubes into registration with the feed opening 26. A tension spring 216 is attached to the link 206 and the frame 20 to hold the link in pressure engagement with the cam 214.

In Figure 4, each of the cups 66 has a pivot 218 rotatably supported in a bore 220 in the cutting block 44. The pivots 218 are coaxial one with the other and with shafts 222 fixed to the cups 66 and rotatably journaled in the bowl 48. Collars 224 are fixed to the shafts 222 and engage the bowl to restrain the shafts from relative axial movement in the openings 226 in the bowl.

An arm 228 is fixed to each shaft 222 and the arms are loosely connected with push rods 230 slidably supported in openings 232 in the bowl flange 234 and a bowl supporting frame 236 to which the flange is connected. The push rods 230 are additionally slidably supported in bearings 238 attached to the frame 236.

Compression springs 240 are mounted on the push rods 230 and abut the frame 236. Flanges 242 are fixed to the push rods and support the lower ends of the springs to yieldingly hold the push rods downwardly in bearing engagement with cams 244 fixed to the shaft 112.

Figures 7 and 8 illustrate the normal positions of the cups 66 when in the fruit receiving and reaming positions. However, the two cups may be pivoted to the skin ejecting position of Figure 9 through upward movement of the push rods 230, which engage the arms 228 and impart pivotal movement to the shafts 222. The push rods have their upper ends loosely guided in slots 246 in the arms so as to positively return the cups to their normal positions through the action of the springs 240 when released by the cams 244.

Each cup 66 is provided with a slot 248 in which is normally disposed a finger 250 pivotally connected at 252 with the cup and provided with a rod 254 slidably mounted between guide rods 256 attached to the cutting block 44. With the cups positioned according to Figures 7 and 8, the fingers 250 lie in the slots 248 and constitute portions of the cups. When the cups are pivoted to the position of Figure 9, the pivotal connections 252 are elevated and the fingers 250 pivoted outwardly of the cups to positively eject the fruit skin 258 from the cups. The cups 66 are pivoted simultaneously and the rods 256 function as a sliding fulcrum for the rods 254 so that the fingers 250 are effectively pivoted outwardly of the cups notwithstanding the fact that the fruit skins might be pressed firmly into the cups. The inner faces of the cups are roughened so as to restrain the skins from rotation while the reamers are in active engagement with the fruit halves.

The fruit juices flow into the bowl 48 and the skins are also dropped into the bowl, the latter being provided with an outlet opening 260 through which the fruit juices and the skins flow to a zone of separation, as on a screen or the like.

Figure 13 illustrates a modification in that the shank 262 corresponding to the shank 40 is provided with slots 264 for the reception of screws 266 attached to the frame 20 and provided with nuts 268 for clamping the shank to the frame. Thus the shank 262 may be adjusted vertically to the end that the blade 36 may be similarly adjusted to accommodate larger or smaller fruit, the slots 38 being sufficiently wide to accommodate such adjustment of the blade.

The holder 60 remains in its forward position for a relatively short period of time. Since the reaming operation must be comparatively slow, the holder is so actuated as to make allowances for the reaming operation. The holder remains in its retracted position until the reamers are up and out of the way, after which it snaps forward in time to catch the fruit as it rolls from the feeding chute 24. As soon as the knife begins to sever the fruit, the fingers of the holder begin to retract so that by the time the fruit is cut all the way through, the fingers are entirely out of the way to permit the halves to fall apart and into the receiving cups.

Without further elaboration, the foregoing will so fully explain my invention, that others may, by applying current knowledge, readily adapt the same for use under various conditions of service.

I claim:

1. In a fruit juice extractor, the combination of two fruit supporting cups, a fruit support located between said cups, means for delivering one fruit at a time to said support, a retractable holder for balancing fruit on said support, a severing means for dividing the fruit into halves to cause the latter to fall apart and into the respective cups, reamers coacting with said cups for extracting fruit juices from the halves, and means for actuating said first mentioned means, said holder, said severing means and said reamers in a predetermined timed order.

2. In a fruit juice extractor, the combination of two fruit supporting cups, rotative fruit containers for holding the fruit in vertical columns, a fruit support located between said cups, a chute for delivering fruit to said support, means for delivering one fruit at a time from the successive fruit columns to said chute, a severing means for dividing the fruit into halves to cause the latter to fall apart and into the respective cups, reamers coacting with said cups for extracting fruit juices from the halves, and means for respectively actuating said rotative fruit containers, said severing means and said reamers in a predetermined timed order.

3. In a fruit juice extractor, the combination of two horizontally spaced fruit supporting cups, a fruit support located between said cups, a plurality of upright fruit containers for holding fruit in vertical columns and having their bottom ends open, said containers being located above said fruit support and connected as a unit for rotation about a vertical axis, a stationary floor at the bottom ends of said containers to support the fruit therein and having a fruit outlet opening, a gravity conveyor for receiving fruit dropped through said opening and delivering the fruit to said support, a feeder means stationary with respect to said containers for damming all but the lowermost fruit in successive containers rotated over said opening, a retractable holder for balancing fruit on said support, a severing means for dividing the fruit into halves to cause the latter to fall apart and into the respective cups, rotative and retractable reamers coacting with said cups for extracting fruit juices from the halves, and means for respectively actuating said containers, said holder, said severing means and said reamers in a predetermined timed order.

4. The invention described in claim 3 wherein said containers are in the nature of tubes having circumferentially extending slots therein, and in which said feeder means includes a separator successively receivable in said slots to pass between the two lowermost fruit in the container over said outlet opening.

5. The invention described in claim 3 wherein said containers comprise tubes having circumferentially extending slots therein, and in which said feeder means includes a blade movable freely in the successive slots to pass between the two lowermost fruit in the successive containers moving across said outlet opening.

6. The invention described in claim 3 wherein said support is relatively narrow and arranged with its longitudinal axis transversely of the plane of said cups, said holder including spaced fingers arranged to move to a position above the support for supporting fruit therebetween, said severing device including a vertically movable blade, and said holder being retractable to a position for releasing the fruit halves prior to their separation.

7. In a fruit juice extractor, the combination of two horizontally spaced fruit supporting cups, a fruit support located between said cups, a plurality of upright fruit containers for holding fruit in vertical columns and having their bottom ends open, said containers being located above said fruit support and connected as a unit for rotation about a vertical axis, a stationary floor at the bottom ends of said containers to support the fruit therein and having a fruit outlet opening, a gravity conveyor for receiving fruit dropped through said opening and delivering the fruit to said support, a feeder means stationary with respect to said containers for damming all but the lowermost fruit in successive containers rotated over said opening, a retractable holder for balancing fruit on said support, a severing means for dividing the fruit into halves to cause the latter to fall apart and into the respective cups, rotative and retractable reamers coacting with said cups for extracting fruit juices from the halves, means for rotating said reamers in unison, means for rotating said containers step by step, said severing means including a vertically movable blade, means for reciprocating said blade, means for actuating said holder in a predetermined timed order with respect to said blade, and means for reciprocating said reamers in a predetermined timed order with respect to said blade.

8. The invention described in claim 1 wherein fruit skin ejectors are provided for said cups.

9. The invention described in claim 2 wherein said fruit cups are rotatable to skin ejecting positions, fingers pivotally connected with the cups for prying fruit skins therefrom, and means for imparting relative movement to the cups and said fingers.

10. The invention described in claim 3 wherein said cups are mounted for movement to fruit skin ejecting positions, means coacting with said cups to pry the fruit skins therefrom, and means for actuating the cups and said last mentioned means.

11. The invention described in claim 3 wherein said containers are in the nature of tubes having circumferentially extending slots therein, said feeder means including a separator successively receivable in said slots to pass between the two lowermost fruit in the container over said outlet opening, said cups being mounted for rotation to skin ejecting positions, fingers for prying the fruit skins from the cups, said fingers being pivotally connected with the cups, and means for actuating the cups and the fingers.

12. The invention described in claim 3 wherein said containers comprise tubes having circumferentially extending slots therein, said feeder means including a blade movable freely in the successive slots to pass between the two lowermost fruit in the successive containers moving across said outlet opening, said cups having slots and being mounted for rotation to skin ejecting positions, fingers normally lying in the slots in the cups, said fingers being pivotally connected with the respective cups and provided with slidably and pivotally guided arms, and means for rotating said cups to impart relative pivotal movement to said fingers for prying fruit skins from the cups.

13. In a fruit juice extractor, the combination of two fruit supporting cups, provided with slots and mounted for movement to skin ejecting positions, fingers normally lying in the slots in the cups and pivotally connected therewith, means for actuating the cups to impart relative pivotal movement to the fingers for prying fruit skins from the cups, a fruit support located between said cups, means for delivering one fruit at a time to said support, a severing means for dividing the fruit into halves to cause the latter to fall apart and into the respective cups, reamers coacting with said cups for extracting fruit juices from the halves, and means for actuating said second mentioned means, said severing means, said reamers and said cup actuating means in a predetermined timed order.

HERBERT FROMM.